United States Patent [19]
Wada

[11] Patent Number: 6,023,190
[45] Date of Patent: Feb. 8, 2000

[54] HIGH VOLTAGE GENERATION CIRCUIT WHICH GENERATES HIGH VOLTAGE BY DIGITALLY ADJUSTING CURRENT AMOUNT FLOWING THROUGH CAPACITOR

[75] Inventor: Tomohisa Wada, Hyogo, Japan

[73] Assignee: Mitsubishi Denki Kabushiki Kaisha, Tokyo, Japan

[21] Appl. No.: 09/055,259

[22] Filed: Apr. 6, 1998

[30] Foreign Application Priority Data

Oct. 15, 1997 [JP] Japan ................................. 9-282303

[51] Int. Cl.$^7$ ........................................................ G05F 1/10

[52] U.S. Cl. ........................ 327/540; 327/172; 327/175; 327/538; 323/283

[58] Field of Search .................................... 327/540, 541, 327/530, 543, 175, 172; 323/222, 224, 232, 266, 282, 283

[56] References Cited

U.S. PATENT DOCUMENTS

| | | | |
|---|---|---|---|
| 5,491,445 | 2/1996 | Moller et al. | 327/540 |
| 5,572,478 | 11/1996 | Sato et al. | 365/226 |
| 5,604,383 | 2/1997 | Matsuzaki | 257/778 |
| 5,661,394 | 8/1997 | Nakao et al. | 323/222 |
| 5,747,977 | 5/1998 | Hwang | 323/222 |
| 5,877,611 | 3/1999 | Brkovic | 323/222 |

*Primary Examiner*—Jung Ho Kim
*Attorney, Agent, or Firm*—McDermott, Will & Emery

[57] ABSTRACT

A high voltage generation circuit includes an inductor, a PN diode, a capacitor and a transistor. A high voltage sampling/division circuit, a control register, a voltage comparator, a counter, a pulse generation circuit and a ring oscillator in the high voltage generation circuit detect whether voltage generated through the capacitor is a desired high voltage or not and generates a pulse signal which controls ON/OFF of the transistor. Accordingly, a path of current flowing into the capacitor is changed and the generated voltage is digitally adjusted.

6 Claims, 12 Drawing Sheets

FIG. 2
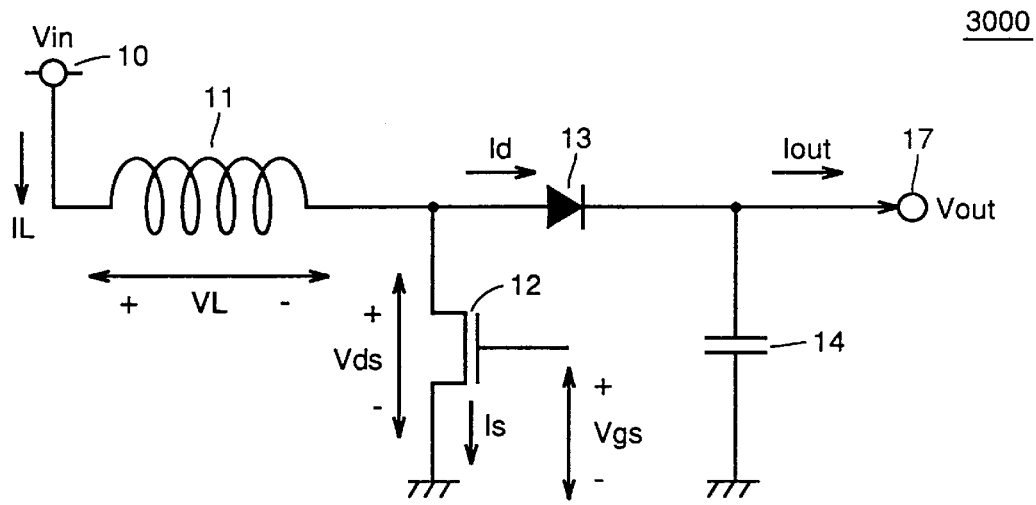
FIG. 4A /EN
FIG. 4B CLK=T(0)
FIG. 4C S1
FIG. 4D S2
FIG. 4E φ compare
FIG. 4F φ cntupdate
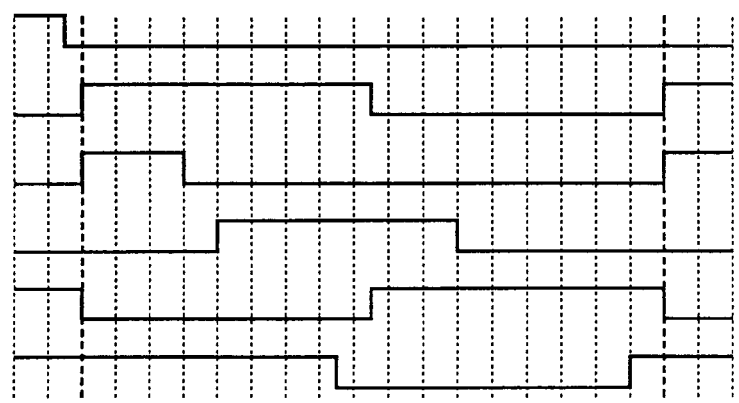

FIG. 3A  Vgs
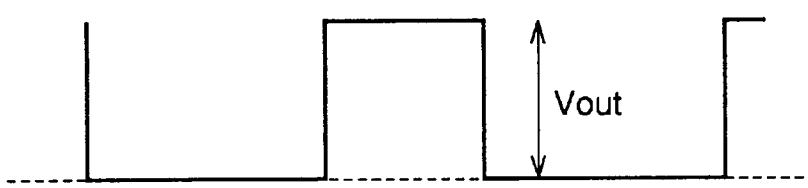
FIG. 3B  Vds
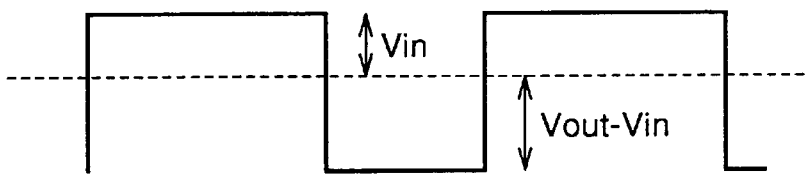
FIG. 3C  VL
FIG. 3D  Is
FIG. 3E  Id
FIG. 3F  IL FIG. 12A CLK=T(0)
FIG. 12B φ cntupdate
FIG. 12C /dec(i)
FIG. 12D P(i)
FIG. 12E SetQ
FIG. 12F ResetQ
FIG. 12G PULSE FIG. 14 PRIOR ART
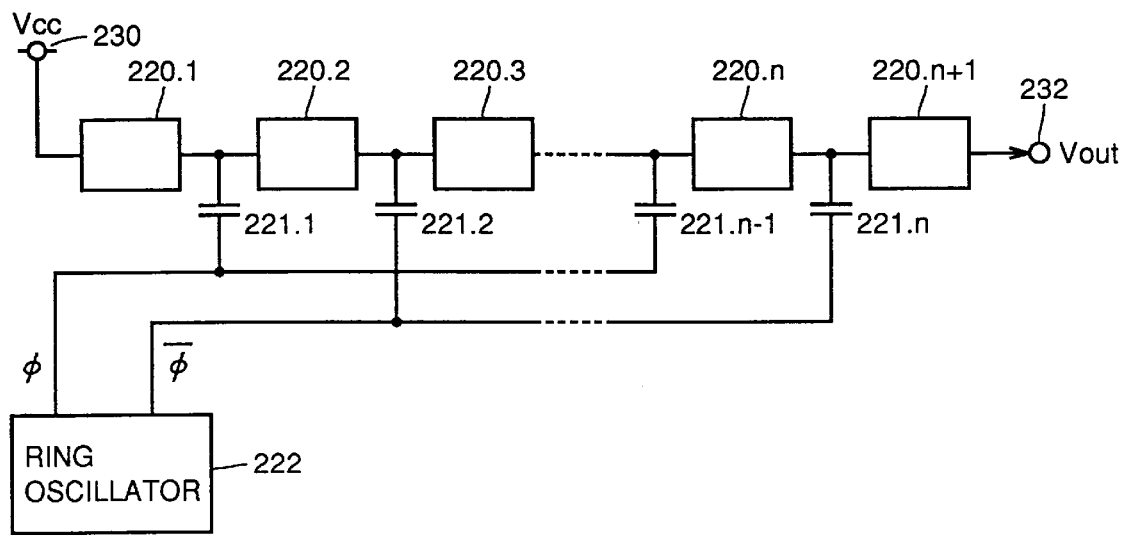
FIG. 15A $\phi$
PRIOR ART
FIG. 15B $\overline{\phi}$
PRIOR ART
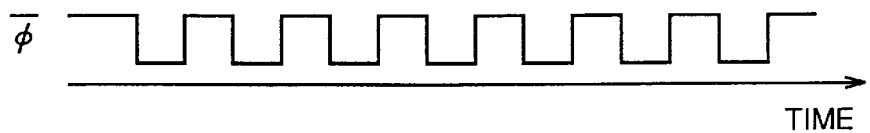
TIME

HIGH VOLTAGE GENERATION CIRCUIT WHICH GENERATES HIGH VOLTAGE BY DIGITALLY ADJUSTING CURRENT AMOUNT FLOWING THROUGH CAPACITOR

BACKGROUND OF THE INVENTION

1. Field of the Invention

The present invention relates to a high voltage generation circuit, and particularly relates to a high voltage generation circuit responsive to a clock signal to generate a desired voltage.

2. Description of the Background Art

The Dynamic Random Access Memory (DRAM), the Static Random Access Memory (SRAM) and the like are famous as semiconductor memory devices. They are both volatile memories and data stored therein vanishes if the supply voltage is not applied.

In contrast, the flash memory can retain storage data even if the supply voltage is not applied. The flash memory stores charge in a floating gate within a memory cell to achieve nonvolatile storage. In the flash memory, the state of storage of 1 or 0 is generated by injecting/drawing the charge into/out of the floating gate which retains the charge. In this case, the Fowler-Nordheim (FN) tunneling phenomenon or the channel hot electron is used to inject/draw the charge into/out of the floating gate. In order to generate such a state, voltage higher than the operating supply voltage of a device is generally required.

Referring to FIG. 14, a configuration of a high voltage generation circuit which generates such high supply voltage is described.

FIG. 14 is a circuit diagram showing one example of a specific configuration of a conventional high voltage generation circuit 2000.

High voltage generation circuit 2000 illustrated in FIG. 14 includes a plurality of capacitor elements 221.1, ..., 221.n, a plurality of rectifying elements 220.1, ..., 220.n+1 and a ring oscillator 222.

The plurality of rectifying elements 220.1, ..., 220.n+1 are connected in series between an input terminal 230 receiving high voltage (Vcc) and an output terminal 232. The plurality of capacitor elements 221.1, ..., 221.n each has one terminal connected to a respective one of output nodes of rectifying elements 220.1, ..., 220.n. Ring oscillator 222 generates two periodic pulses φ and /φ.

The timing charts of FIG. 15A and FIG. 15B respectively show periodic pulse φ and periodic pulse /φ. As shown in FIGS. 15A and 15B, the phase of periodic pulse φ is an inverted one of the phase of periodic pulse /φ.

The other terminals of capacitor elements 221.1, 221.3, ... respectively receive periodic pulses φ from ring oscillator 222. The other terminals of capacitor elements 221.2, 222.4, ... respectively receive periodic pulses /φ from ring oscillator 222.

An operation of the conventional high voltage generation circuit 2000 is next described.

If one end of capacitor element 221.i ($1 \leq i \leq n$) receives a periodic pulse at an H level, current flows in the direction of rectifying element 220.i+1. If capacitor element 221.i receives a periodic pulse at an L level, current flows from the direction of rectifying element 220.i. As a result, a high voltage Vout is generated at output terminal 232 placed at the last stage.

Specific examples of rectifying elements 220.1, ..., 220.n+1 are the PN diode, the MOS transistor and the like.

If the PN diode is used as the rectifying element, for example, the threshold voltage is 0.7V–0.8V. If the MOS transistor is used as the rectifying element, the element also has a threshold voltage of an almost equivalent value.

Therefore, in the conventional high voltage generation circuit 2000, voltage larger than the threshold voltage must be applied to both ends of each rectifying element in order to allow current to sufficiently flow and generate high voltage. If the supply voltage (Vcc) is reduced, the amplitude of voltage of two periodic pulses φ and /φ output from ring oscillator 222 decreases and current does not sufficiently flow.

In a semiconductor memory device represented by the flash memory, the supply voltage tends to be decreased. Therefore, if the conventional high voltage generation circuit 2000 is applied to the flash memory as it is, generation of high voltage required for an internal operation becomes difficult as the supply voltage is decreased.

SUMMARY OF THE INVENTION

One object of the present invention is to provide a high voltage generation circuit which can generate a desired high voltage which is sufficiently large even if the supply voltage is low.

A high voltage generation circuit according to the present invention includes a first capacitor element and generates a voltage by changing a path of current flowing to the first capacitor element and storing charge in the first capacitor element. The high voltage generation circuit further includes: a comparison and determination circuit responsive to a clock signal to compare a generated voltage with a desired voltage and determine if the generated voltage is equal to the desired voltage; a count circuit which outputs its value digitally controlled based on the result of the comparison and determination by the comparison and determination circuit; a pulse generation circuit which outputs a pulse signal having its duty factor changed based on a value of the count circuit; and a switch circuit which changes the path of current based on the pulse signal output from the pulse generation circuit.

Accordingly, an advantage of the present invention is that a desired high voltage can be generated highly precisely by digitally adjusting the current flowing into a capacitor element even if the level of the supply voltage is low.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a circuit diagram provided for describing a basic principle of the high voltage generation circuit 1000 employing an inductor.

FIGS. 3A–3F are timing charts provided for describing an operation of a high voltage generation circuit 300 of FIG. 2.

FIGS. 4A–4F are timing charts provided for describing a basic operation of the high voltage generation circuit 1000 of the first embodiment of the invention.

FIG. 14 is a circuit diagram showing one example of a specific configuration of a conventional high voltage generation circuit 2000.

FIGS. 15A–15B are timing charts respectively showing periodic pulses $\phi$ and $/\phi$ generated by a ring oscillator 222.

DESCRIPTION OF THE PREFERRED EMBODIMENTS

First Embodiment

A high voltage generation circuit according to the first embodiment of the invention is hereinafter described.

A high voltage generation circuit 1000 according to the first embodiment enables a desired high voltage to be digitally generated using a low supply voltage.

One example of a case in which the high voltage generation circuit of the first embodiment is provided for a semiconductor memory device (e.g. flash memory) is described below using FIG. 1.

Figure 1:
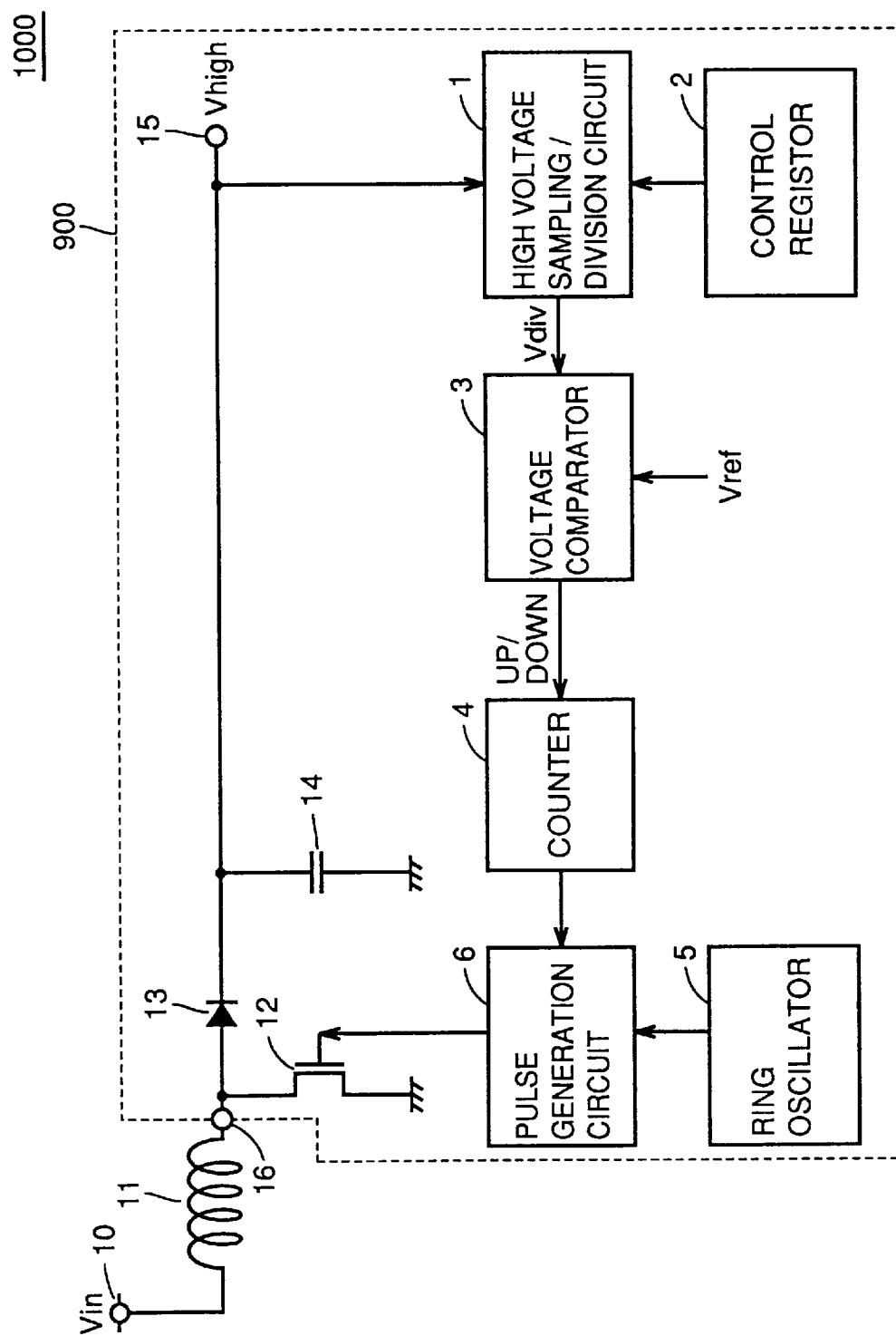
FIG. 1 is a schematic view showing one example of a case in which a high voltage generation circuit 1000 of the first embodiment is applied to a semiconductor memory device 900.

Referring to FIG. 1, high voltage generation circuit 1000 includes an inductor 11, an MOS transistor 12, a diode 13 and a capacitor 14. The inductance of inductor 11 is hereinafter represented by L.

Inductor 11 is externally attached to a semiconductor memory device 900. Inductor 11 is connected between a Vin terminal 10 which supplies a supply voltage Vin (e.g. low supply voltage of 1.8V) and an external connection terminal 16 of semiconductor memory device 900.

Diode 13 is connected between external connection terminal 16 and a Vhigh terminal 15 which outputs a high voltage Vhigh. MOS transistor 12 is connected between external connection terminal 16 and a ground potential GND. Capacitor 14 is connected between Vhigh terminal 15 and ground potential GND.

MOS transistor 12 connects (shorts) or disconnects (opens) one end of inductor 11 and ground potential GND. Capacitor 14 stores charge supplied from diode 13 which is a rectifying element. Accordingly, voltage is generated at Vhigh terminal 15.

High voltage generation circuit 1000 further includes a high voltage sampling/division circuit 1, a control register 2, a voltage comparator 3, a counter 4, a ring oscillator 5 and a pulse generation circuit 6.

Voltage division by high voltage sampling/division circuit 1 allows voltage generated at Vhigh terminal 15 to have a voltage level which can be compared with a reference voltage Vref by voltage comparator 3 which is described below.

Control register 2 specifies the magnitude of the voltage obtained by division. The magnitude is variable. Various levels of voltage can be generated by specifying the magnitude of the divided voltage by control register 2.

Voltage comparator 3 compares reference voltage Vref set at a prescribed value with a voltage obtained by the division by high voltage sampling/division circuit 1.

Counter 4 has a counter value of 4 bits which is changed according to a result of the comparison by voltage comparator 3. Ring oscillator 5 is the one formed of 17 stages and generates many periodic pulses shifted in phase.

Pulse generation circuit 6 generates a periodic pulse having different periods of High level by processing an output pulse from ring oscillator 5 according to an output from counter 4. An output from pulse generation circuit 6 controls an ON time (period of conductive state) of MOS transistor 12.

In high voltage generation circuit 1000 according to the first embodiment of the invention, a feedback loop is formed as a whole, and a high voltage according to a value of control register 2 is generated by control of the feedback.

A basic principle of a high voltage generation circuit using an inductor is described below using FIG. 2 and FIGS. 3A–3F that are timing charts.

FIG. 2 is a circuit diagram provided for describing a basic principle of high voltage generation circuit 1000 using an inductor and FIGS. 3A–3F are timing charts provided for describing the operation thereof.

A high voltage generation circuit shown in FIG. 2 (hereinafter referred to as high voltage generation circuit 3000) is a DC—DC converter of a step-up type, and includes an inductor 11, an MOS transistor 12, a diode 13 and a capacitor 14. The connections of inductor 11, MOS transistor 12, diode 13 and capacitor 14 are as described referring to FIG. 1. Note that in high voltage generation circuit 3000, diode 13 and capacitor 14 are connected to a Vout terminal 17 which generates voltage Vout.

Vgs of FIG. 3A, Vds of FIG. 3B, and VL of FIG. 3C respectively represent a gate-to-source voltage of MOS transistor 12, a drain-to-source voltage of MOS transistor 12, and potential of inductor 11.

Further, Is of FIG. 3D, Id of FIG. 3E, and IL of FIG. 3F respectively represent a source current of MOS transistor 12, current flowing into diode 13, and current flowing from Vin terminal 10 into inductor 11. Iout of FIG. 2 represents current flowing from diode 13 into Vout terminal 17.

Operation in Ton

During a period in which gate-to-source voltage Vgs is at the H level (referred to as Ton), MOS transistor 12 is turned on and current flows from Vin terminal 10 via inductor 11 to ground potential GND. In this case, if ON resistance of MOS transistor 12 is sufficiently low, drain-to-source voltage Vds is 0V. Accordingly, voltage of VL=Vin is applied to both ends of inductor 11. If a constant voltage is applied to both ends of inductor 11, current of inductor 11 increases in linear proportion to time due to its property. This relation is shown by the following equation (1).

$$\Delta IL = \Delta Is = Vin/L \cdot \Delta t \qquad (1)$$

In the equation above, $\Delta t$ represents an infinitesimal time. Since current Id=0, $\Delta IL = \Delta Is$. Accordingly, an amount of variation of the current of inductor 11 during the period of Ton is obtained by the following equation (2).

$$\Delta IL = \Delta Is = Vin/L \cdot Ton \quad (2)$$

Operation in Toff

During a period in which gate-to-source voltage Vgs is at the L level (referred to as Toff), MOS transistor 12 is turned off, and the current flowing through inductor 11 flows in the direction of the diode. Due to the property of inductor 11, current IL does not immediately become 0. Suppose that an output voltage is Vout and voltage drop of diode 13 is ignored (Vout>10 v), the current of inductor 11 decreases as shown by the following equation (3).

$$\Delta IL = \Delta Id = -(Vout - Vin)/L \cdot \Delta t \quad (3)$$

As a result, an amount of variation of the current of inductor 11 during the Toff period is given by the following equation.

$$\Delta IL = \Delta Id = -(Vout - Vin)/L \cdot Toff \quad (4)$$

In a stable state, the amounts of variation obtained by the equations (2) and (4) are equal to each other, and the following equation (5) is obtained.

$$Vin/L \cdot Ton = (Vout - Vin)/L \times Toff \quad (5)$$

Using the equation (5), output voltage Vout is given by the equation (6).

$$Vout = Vin \cdot (Ton + Toff)/Toff \quad (6)$$

In the equation above, (Ton+Toff) indicates a period of a pulse supplied to the gate electrode of MOS transistor 12, and Toff indicates a width of Low. Therefore, by changing a duty factor (ratio between High width of a pulse and cycle time), input voltage can be stepped up to a desired high voltage. For example, if Ton=90 ns and Toff=10 ns, output voltage Vout which is ten times higher than input voltage Vin is obtained.

In high voltage generation circuit 1000, a pulse which digitally controls ON/OFF of MOS transistor 12 is generated using high voltage sampling/division circuit 1, control register 2, voltage comparator 3, counter 4, ring oscillator 5 and pulse generation circuit 6.

A basic operation of the entire high voltage generation circuit 1000 according to the first embodiment is briefly described using FIGS. 4A–4F that are timing charts.

/EN of FIG. 4A represents an enable signal which controls ring oscillator 5. CLK (=T(0)) of FIG. 4B represents a pulse signal T(0) output from ring oscillator 5. CLK is a main clock of the system.

Signal S1 of FIG. 4C represents a clock signal which controls a sampling operation by high voltage sampling/division circuit 1. Signal S2 of FIG. 4D represents a clock signal which controls a division operation by high voltage sampling/division circuit 1.

Signal φcompare of FIG. 4E denotes a clock signal which controls a comparison operation by voltage comparator 3. Signal φcntupdate of FIG. 4F denotes a clock signal which controls a count operation by counter 4.

As shown in FIGS. 4A–4F, high voltage generation circuit 1000 carries out, during a period of one cycle of pulse signal CLK (=pulse signal T(0)), sampling of high voltage (corresponding to signal S1), division by a capacitor (corresponding to signal S2), comparison between a voltage obtained by the division and reference voltage Vref (corresponding to signal φcompare), and update of the counter (corresponding to φcntupdate).

One example of a specific configuration of ring oscillator 5 in the first embodiment of the invention is described below using the circuit diagram of FIG. 5.

Figure 5:
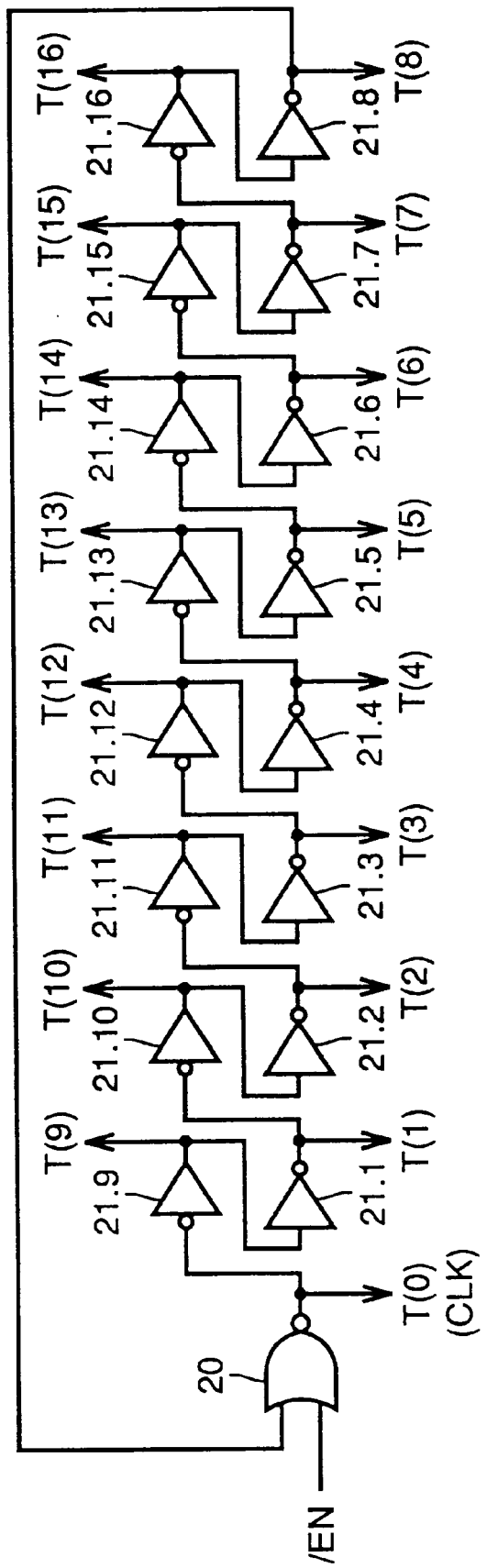
FIG. 5 is a circuit diagram showing one example of a specific configuration of a ring oscillator 5 of the first embodiment of the invention.

As shown in FIG. 5, ring oscillator 5 includes a plurality of inverter circuits 21.1, ..., 21.16 and an NOR circuit 20.

The plurality of inverter circuits 21.1, ..., 21.16 are connected in series to each other. An output node of NOR circuit 20 is connected to inverter circuit 21.9. A first input node of NOR circuit 20 receives enable signal /EN. A second input node of NOR circuit 20 receives an output signal from inverter circuit 21.8.

Pulse signals T(1), ..., T(16) are generated from output nodes of respective inverter circuits 21.1, ..., 21.16. Pulse signal T(0) is generated from the output node of NOR circuit 20.

Figure 6:
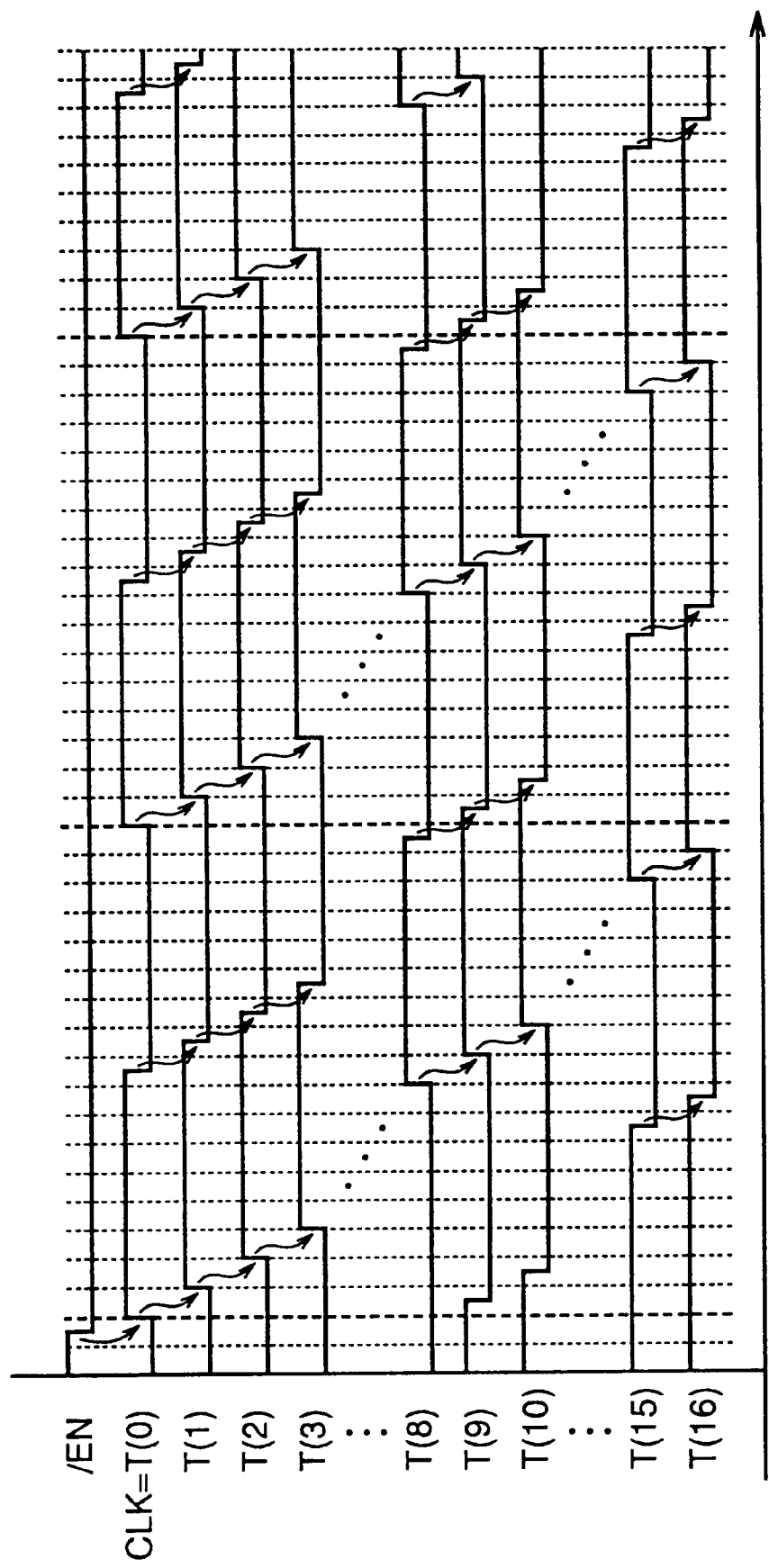
FIG. 6 is a timing chart showing an operation of the ring oscillator 5 of FIG. 5.

An operation of ring oscillator 5 according to the first embodiment shown in FIG. 5 is described using FIG. 6 which is a timing chart thereof.

As shown in FIG. 6, ring oscillator 5 starts oscillating when assertion of enable signal /EN as Low is provided (enable signal /EN is set at an Low level). After the assertion of enable signal /EN, transition of a pulse signal T(0) from the low level to a high level first occurs. The transition from the low level to the high level thereafter occurs in an ascending order from pulse signal T(i) to pulse signal T(i+1).

Responsive to enable signal /EN, ring oscillator 5 outputs a plurality of periodic pulses (T(0), ..., T(16)) that are shifted in phase.

In pulse generation circuit 6, a pulse which is at the high level during a period in which pulse signals T(k) to T(15) are at the high level (corresponding to Ton) is generated. Accordingly, if k=0 (minimum value), a pulse having the maximum width of Ton is generated, and if k=15 (maximum value), no pulse is generated.

One example of a specific structure of high voltage sampling/division circuit 1 of the first embodiment is described below using the circuit diagram of FIG. 7.

Figure 7:
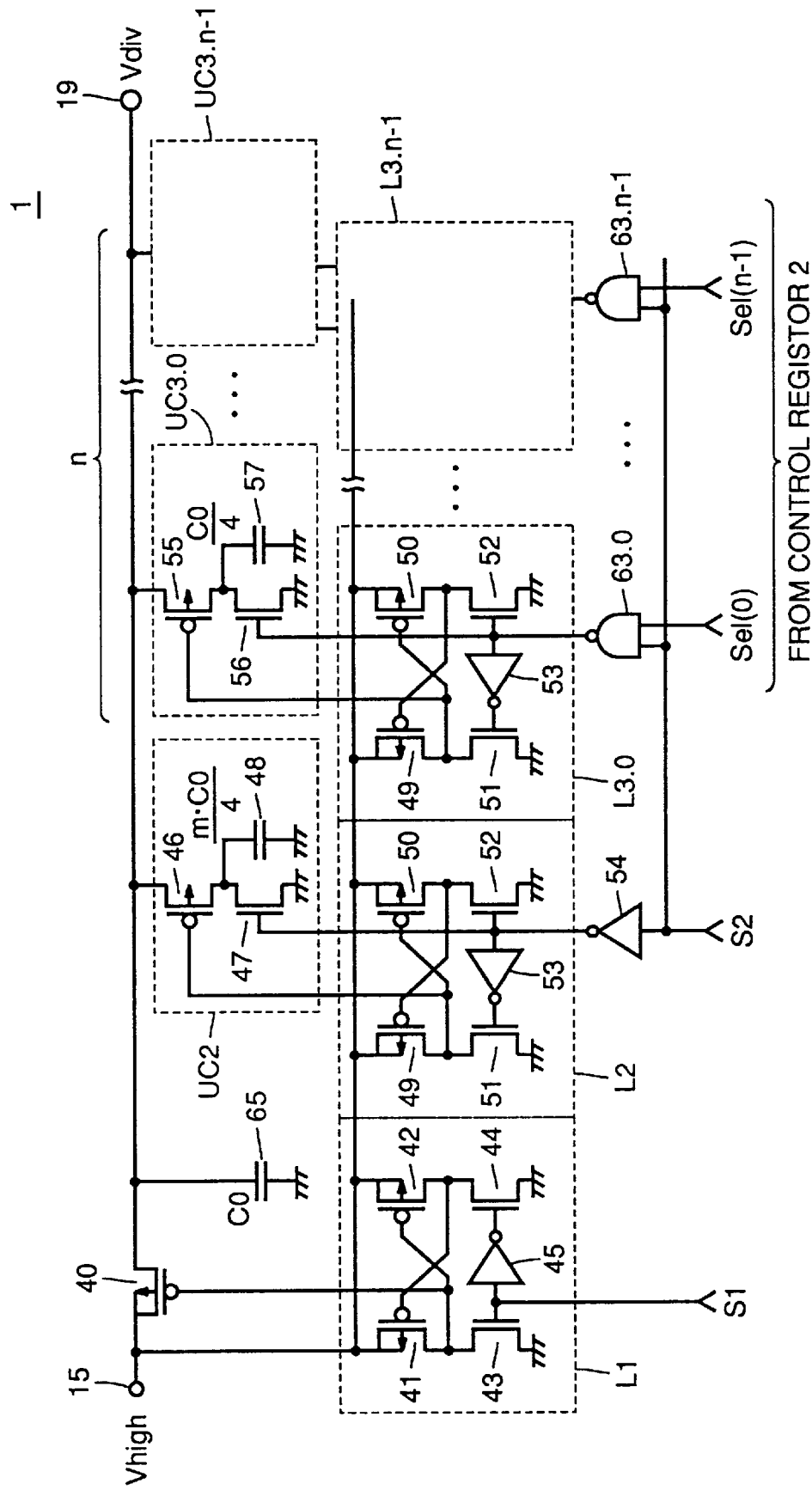
FIG. 7 is a circuit diagram showing one example of a specific configuration of a high voltage sampling/division circuit 1 of the first embodiment of the invention.

Referring to FIG. 7, high voltage sampling/division circuit 1 is provided with level converters L1, L2, L3.0, ..., L3.n−1, a P channel MOS transistor 40, a capacitor 65, and capacitor units UC2, UC3.0, ..., UC3.n−1.

Level converter L1 is provided corresponding to P channel MOS transistor 40. Level converter L2 is provided corresponding to capacitor unit UC2. Further, level converters L3.0, ..., L3.n−1 (representatively referred to as L3 in the following) are respectively provided corresponding to respective capacitor units UC3.0, ..., UC3.n−1 (representatively referred to as UC3 in the following).

Description of level converter L1 is given below. Level converter L1 includes P channel MOS transistors 41 and 42, N channel MOS transistors 43 and 44, and an inverter circuit 45.

P channel MOS transistor 41 and N channel MOS transistor 43 are connected in series between Vhigh terminal 15 and ground potential GND. P channel MOS transistor 42 and N channel MOS transistor 44 are connected in series between Vhigh terminal 15 and ground potential GND. The gate electrode of P channel MOS transistor 41 is connected to a connection node between P channel MOS transistor 42 and N channel MOS transistor 44. The gate electrode of P channel MOS transistor 42 is connected to a connection node between P channel MOS transistor 41 and N channel MOS transistor 43. Inverter circuit 45 is connected between the gate electrode of N channel MOS transistor 43 and the gate electrode of N channel MOS transistor 44.

Description of level converter L2 is given below. Level converter L2 includes P channel MOS transistors 49 and 50, N channel MOS transistors 51 and 52, and an inverter circuit 53.

P channel MOS transistor 49 and N channel MOS transistor 51 are connected in series between Vhigh terminal 15 and ground potential GND. P channel MOS transistor 50 and N channel MOS transistor 52 are connected in series between Vhigh terminal 15 and ground potential GND. The gate electrode of P channel MOS transistor 49 is connected to a connection node between P channel MOS transistor 50 and N channel MOS transistor 52. The gate electrode of P channel MOS transistor 50 is connected to a connection node between P channel MOS transistor 49 and N channel MOS transistor 51. Inverter circuit 53 is connected between the gate electrode of N channel MOS transistor 51 and the gate electrode of N channel MOS transistor 52.

The configuration of level converter L3 is identical to that of level converter L2.

Description of capacitor unit UC2 is given below. Capacitor unit UC2 includes a P channel MOS transistor 46, an N channel MOS transistor 47 and a capacitor 48.

P channel MOS transistor 46 and N channel MOS transistor 47 are connected in series between a Vdiv terminal 19 which outputs a voltage Vdiv obtained by the division and ground potential GND. Capacitor 48 is connected between a connection node between P channel MOS transistor 46 and N channel MOS transistor 47 and ground potential GND. The gate electrode of P channel MOS transistor 46 is connected to a connection node between P channel MOS transistor 49 and N channel MOS transistor 51 of corresponding level converter L2. The gate electrode of N channel MOS transistor 47 is connected to an output node of inverter circuit 54 described below.

Description concerning capacitor unit UC3 is given below. Each capacitor unit UC3 includes a P channel MOS transistor 55, an N channel MOS transistor 56, and a capacitor 57.

P channel MOS transistor 55 and N channel MOS transistor 56 are connected in series between Vdiv terminal 19 and ground potential GND. Capacitor 57 is connected between a connection node between P channel MOS transistor 55 and N channel MOS transistor 56 and ground potential GND. The gate electrode of P channel MOS transistor 55 is connected to a connection node between p channel MOS transistor 49 and N channel MOS transistor 51 of corresponding level converter L3. The gate electrode of N channel MOS transistor 56 is connected to an output node of a corresponding NAND circuit 63 described below.

P channel MOS transistor 40 is connected between Vhigh terminal 15 and Vdiv terminal 19. The gate electrode of P channel MOS transistor 40 is connected to a connection node between P channel MOS transistor 41 and N channel MOS transistor 43 of level converter L1. Capacitor 65 is connected between Vdiv terminal 19 and ground potential GND.

In the first embodiment, suppose that the capacitance value of capacitor 65 is C0, the capacitance value of capacitor 48 of capacitor unit UC2 is (m×C0/4), and the capacitance value of capacitor 57 of each capacitor unit UC3 is (C0/4).

High voltage sampling/division circuit 1 further includes an inverter circuit 54, and NAND circuits 63.0, . . . , 63.n−1.

An output node of inverter circuit 54 is connected to an input node of inverter circuit 53 and the gate electrode of N channel MOS transistor 52 of level converter L2, as well as the gate electrode of N channel MOS transistor 47.

NAND circuits 63.0, . . . , 63.n−1 (hereinafter representatively referred to as NAND circuit 63) are provided respectively corresponding to level converters L3.0, . . . , L3.n−1. Each output node of NAND circuit 63 is connected to an input node of inverter circuit 53 and the gate electrode of N channel MOS transistor 52 of corresponding level converter L3 as well as the gate electrode of N channel MOS transistor 56 of corresponding capacitor unit UC3. First input nodes of respective NAND circuits 63 respectively receive selection signals Sel(0), . . . , Sel(n−1) from control register 2.

The gate electrode of N channel MOS transistor 43 and the input node of inverter circuit 45 in level converter L1 receive signal S1 which controls the sampling operation. P channel MOS transistor 40 attains the ON state/OFF state responsive to signal S1 supplied via level converter L1.

The input node of inverter circuit 54 and a second input node of each NAND circuit 63 receive signal S2 which controls the division operation by the capacitor. The MOS transistor included in capacitor unit UC2 attains the ON state/OFF state responsive to signal S2. The MOS transistor included in capacitor unit UC3 attains the ON state/OFF state responsive to signal S2 and corresponding one of the selection signals Sel(0), . . . , Sel(n−1).

Figure 8:
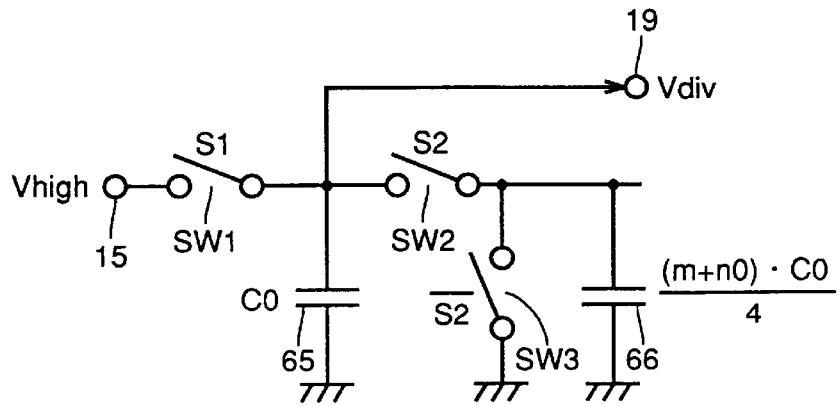
FIG. 8 is a circuit diagram provided for describing a basic operation of the high voltage sampling/division circuit 1 of FIG. 7.

A specific example of a basic operation of high voltage sampling/division circuit 1 shown in FIG. 7 is described using FIG. 8.

A high voltage sampling/division circuit shown in FIG. 8 (hereinafter referred to as high voltage sampling/division circuit 800) includes capacitors 65 and 66 as well as switches SW1, SW2 and SW3.

Signals S1 and S2 are generated at the timing described using FIGS. 4C–4D, and switches SW1, SW2 and SW3 are respectively connected responsive to signal SW1, signal SW2 and signal /SW2 that is inverted signal S2. Capacitor 66 corresponds to a combination of capacitor 48 and n0 capacitor(s) 57 of capacitor unit UC3 shown in FIG. 7.

A period in which signal S1 is asserted (High period) is described. In this case, switch SW1 is in a connected state, high voltage Vhigh is applied to capacitor 65 at the first stage and capacitor 65 is charged to Vhigh level.

Since signal S2 is not asserted in this period, (switch SW2 is in a non-connected state and switch SW3 is in the connected state), capacitor 66 at the second stage is discharged.

A case in which signal S2 is asserted is described. In this case, switch SW2 is in the connected state, and charges are again distributed between the first stage capacitor 65 and the second stage capacitor 66. This relation is shown by the following equation (7).

$$Vhigh \cdot C0 = [1+(m+n0)/4] \cdot C0 \cdot Vdiv \qquad (7)$$

In the equation above, m is a constant, and n0 is a variable which is controlled by control register 2 (n=0, 2, . . . , n−1). According to the first embodiment, n0 is determined by selection signals Sel(0), . . . , Sel(n−1).

If control register 2 specifies variable n0 by a binary value, the value of control register 2 is thermometer decoded (the number of outputs corresponding to the binary value of the input are rendered high), and selection signals Sel(0), . . . , Sel (n−1) are generated. If the magnitude of a capacitance corresponding to n0 is optionally weighed by the binary value, the binary value of control register 2 can be utilized as selection signals Sel(0), . . . , Sel(n−1) as it is.

Voltage Vdiv indicated in the equation (7) is compared with reference voltage Vref by voltage comparator 3 at the next stage.

One example of a specific configuration of voltage comparator 3 according to the first embodiment is described below using FIG. 9 which is a circuit diagram.

Since the first embodiment is based on the low supply voltage, it is difficult to employ an amplifier circuit (e.g. an amplifier of the current mirror type) conventionally used as a voltage comparator. Therefore, a voltage comparator of the latch type operating according to a clock described below is employed.

Figure 9:
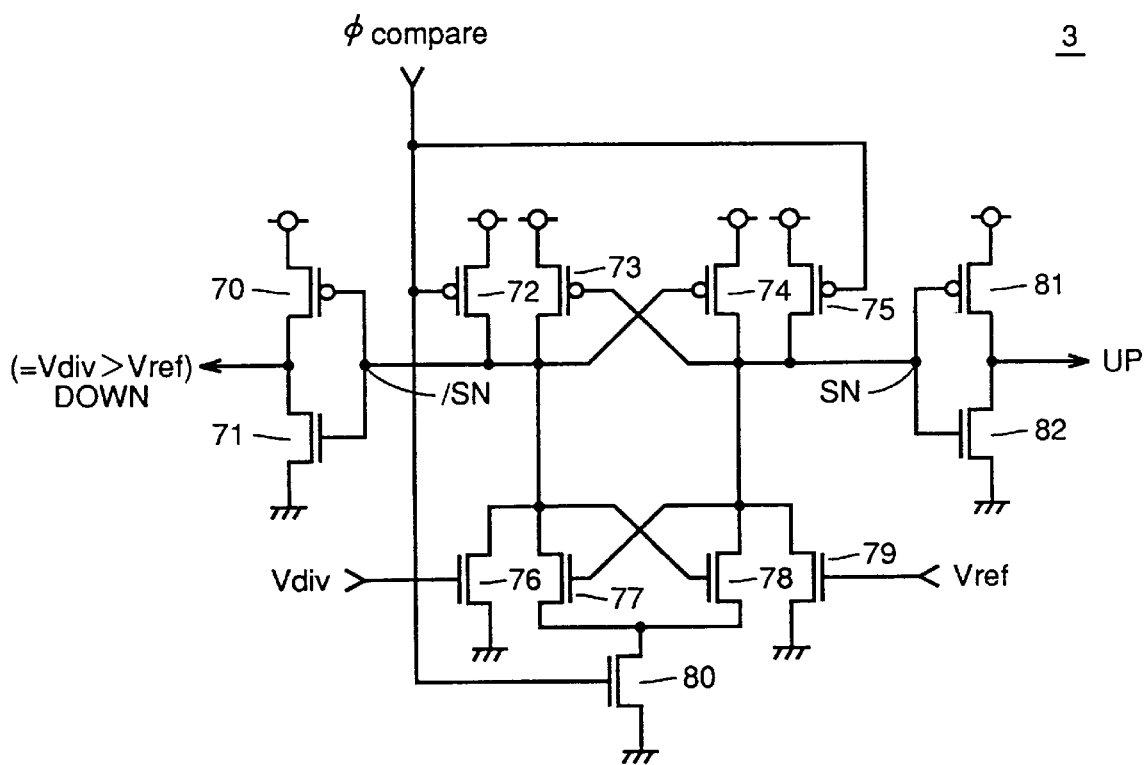
FIG. 9 is a circuit diagram showing one example of a specific configuration of a voltage comparator 3 of the first embodiment of the invention.

With reference to FIG. 9, voltage comparator 3 includes a plurality of MOS transistors 70, 71, . . . , 82.

MOS transistors 70, 72, 73, 74, 75 and 81 are P channel MOS transistors, and MOS transistors 71, 76, 77, 78, 79, 80 and 82 are N channel MOS transistors.

A connection node between the gate electrode of MOS transistor 81 and that of MOS transistor 82 is hereinafter referred to as sense node SN, and a connection node between the gate electrode of MOS transistor 70 and that of MOS transistor 71 is referred to as sense node /SN.

MOS transistor 76 is connected between sense node /SN and ground potential GND. MOS transistor 79 is connected between sense node SN and ground potential GND. The gate electrode of MOS transistor 76 receives voltage Vdiv from high voltage sampling/division circuit 1. The gate electrode of MOS transistor 79 receives reference potential Vref.

MOS transistor 77 is connected between sense node /SN and one condition terminal of MOS transistor 80. MOS transistor 78 is connected between sense node SN and MOS transistor 80. The gate electrode of MOS transistor 77 is connected to sense node SN, and the gate electrode of MOS transistor 78 is connected to sense node /SN.

The other conduction terminal of MOS transistor 80 is connected to ground potential GND, and its gate electrode receives signal φcompare.

MOS transistors 72 and 73 are connected between the supply voltage and sense node /SN. The gate electrode of MOS transistor 72 receives signal φcompare. The gate electrode of MOS transistor 73 is connected to sense node SN.

MOS transistors 74 and 75 are connected between the supply voltage and sense node SN. The gate electrode of MOS transistor 75 receives signal φcompare. The gate electrode of MOS transistor 74 is connected to sense node /SN.

MOS transistors 70 and 71 are connected in series between the supply potential and ground potential GND. MOS transistors 81 and 82 are connected in series between the supply potential and ground potential GND.

A connection node between MOS transistor 70 and MOS transistor 71 outputs DOWN signal. A connection node between MOS transistor 81 and MOS transistor 82 outputs UP signal.

An operation of voltage comparator 3 shown in FIG. 9 is described.

As described above, voltage comparator 3 is a comparison circuit operating at a constant voltage. Voltage comparator 3 compares reference voltage Vref with input voltage Vdiv in synchronization with signal φcompare which is a clock signal. Specifically, voltage comparator 3 is reset when signal φcompare is at the low level, and the comparator starts sensing at an edge at which the signal changes from low to high.

A case in which signal φcompare is at the low level is described. In this case, sense nodes SN and /SN are precharged to be high. During this period, if any voltage difference between reference voltage Vref and input voltage Vdiv is generated, a potential difference is generated at the sense node.

When transition of signal φcompare from low to high occurs, the potential difference is amplified to reach an amplitude of the supply potential.

If input voltage Vdiv is higher than reference voltage Vref, DOWN signal has the high level and the UP signal has the low level. If input voltage Vdiv is lower than reference voltage Vref, DOWN signal has the low level and UP signal has the high level.

Voltage comparator 3 thus senses Vhigh shown in the following equation (8) for the equation (7).

$$Vhigh = [1 + (m + n0)/4] \cdot Vref \qquad (8)$$

One example of a specific configuration of counter 4 according to the first embodiment is described below using FIG. 10 which is a circuit diagram.

Figure 10:
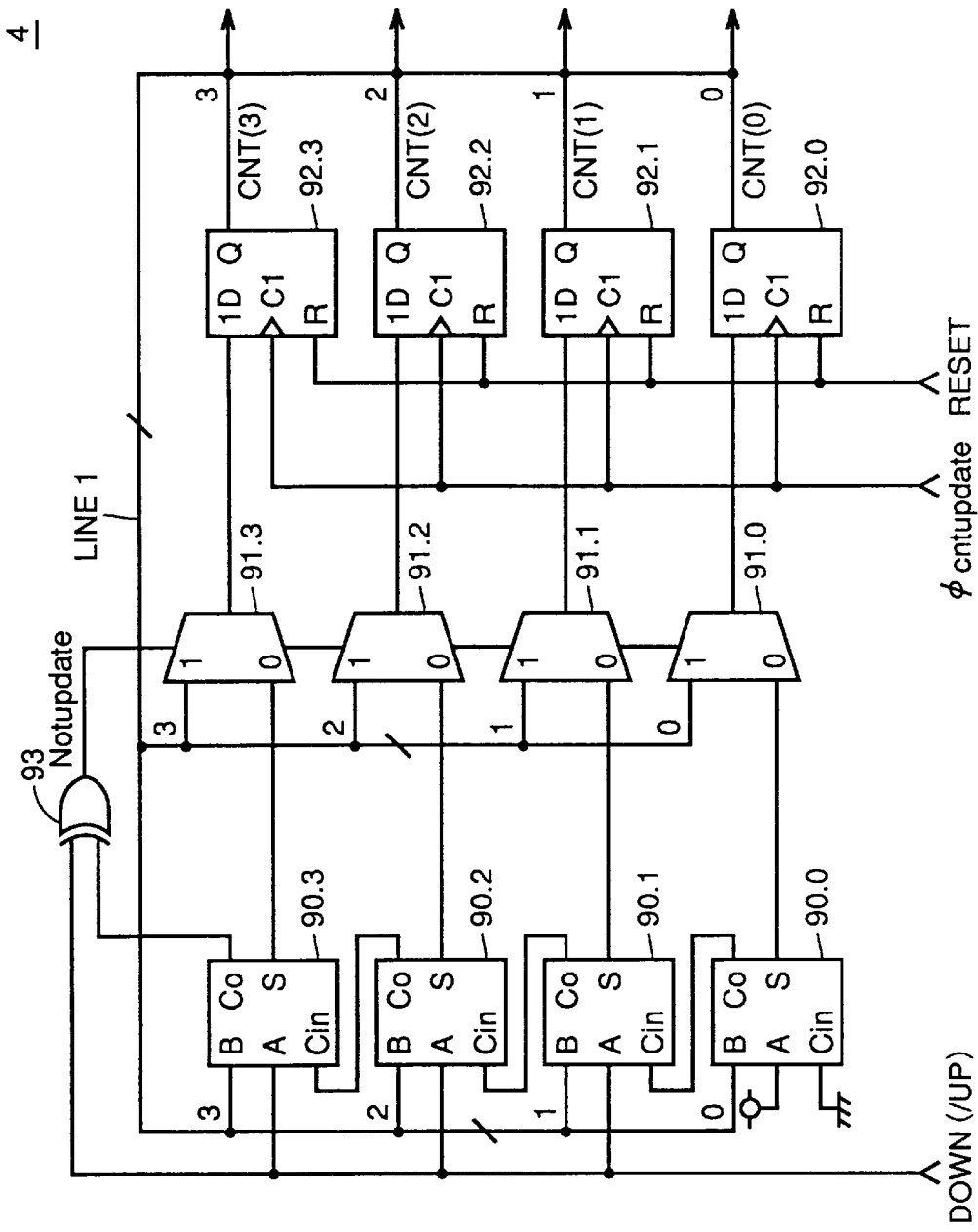
FIG. 10 is a circuit diagram showing one example of a specific configuration of a counter 4 of the first embodiment of the invention.

As shown in FIG. 10, counter 4 includes flip-flops 92.0, 92.1, 92.2 and 92.3, full adders 90.0, 90.1, 90.2 and 90.3, multiplexers 91.0, 91.1, 91.2 and 91.3, and an XOR circuit 93.

Corresponding to respective full adders 90.0, 90.1, 90.2 and 90.3, multiplexers 91.0, 91.1, 91.2 and 91.3 are provided. Further, corresponding to respective multiplexers 91.0, 91.1, 91.2 and 91.3, flip-flops 92.0, 92.1, 92.2 and 92.3 are provided. Those are hereinafter referred to representatively as a full adder 90, a multiplexer 91, and a flip-flop 92.

Description of flip-flop 92 is given below. Flip-flop 92 is a flip-flop with a synchronous reset, and responsive to signal φcntupdate to delay a signal output from corresponding multiplexer 91 and output it. R terminal of each flip-flop 92 receives reset signal RESET.

Count values CNT(0), CNT(1), CNT(2) and CNT(3) are output from Q terminals of respective flip-flops 92.0, 92.1, 92.2 and 92.3. A bit string of four bits formed of these count values is represented by count value CNT(3:0). In count value CNT(3:0), count value CNT(0) corresponds to LSB (the least significant bit), and count value CNT(3) corresponds to MSB (the most significant bit).

Description of full adder 90 is given below. Cin pin of full adder 90.0 is connected to ground potential GND. A terminal is connected to the supply voltage. B terminal receives a signal from a corresponding flip-flop 92 via signal line LINE 1. Co terminal of full adder 90.0 is connected to Cin terminal of full adder 90.1.

A terminal of full adder 90.1 receives DOWN signal (or /UP signal which is the inverted one of UP signal) output from voltage comparator 3. B terminal receives a signal from a corresponding flip-flop 92 via signal line LINE 1. Further, Co terminal is connected to Cin terminal of full adder 90.2.

A terminal of full adder 90.2 receives DOWN signal (or /UP signal) output from voltage comparator 3. B terminal receives a signal from a corresponding flip-flop 92 via signal line LINE 1. Co terminal is connected to Cin terminal of full adder 90.3.

A terminal of full adder 90.3 receives DOWN signal (or /UP signal) output from voltage comparator 3. B terminal receives a signal from a corresponding flip-flop 92 via signal line LINE 1. Co terminal is connected to XOR circuit 93 which is hereinafter described.

XOR circuit 93 receives DOWN signal (or /UP signal) and an output from Co terminal of full adder 90.3 at its input.

Each multiplexer 91 outputs, responsive to an output signal from XOR circuit 93, one of an output from the corresponding full adder 90 or an output from the corresponding flip-flop 92 to the corresponding flip-flop 92.

An operation of counter 4 shown in FIG. 10 is described below.

Counter 4 is a four-bit counter. Based on DOWN signal (or /UP signal) obtained as a result of the comparison by voltage comparator 3, and in response to an edge at which signal φcntupdate changes from the low level to the high level, the content of the count value is updated.

Specifically, if DOWN signal is at the high level, decrement operation is carried out, and if DOWN signal is at the low level, increment operation is carried out.

A case in which the increment operation is specified when count value CNT(3:0) has the maximum value (=1111). In this case, Notupdate signal is output from XOR circuit 93. If Notupdate=1, multiplexer 91 outputs an output signal of the corresponding flip-flop 92. Accordingly, the content of the count value is not updated.

Similarly, if the decrement operation is specified when count value CNT(3:0) has the minimum value (=0000), Notupdate signal (=1) is output from XOR circuit 93. In this case, the content of the count value is not updated.

Count value CNT(3:0) output from counter 4 is used in pulse generation circuit 6 at the next stage, and as described later, used for specifying a timing at which a pulse rises.

Figure 11:
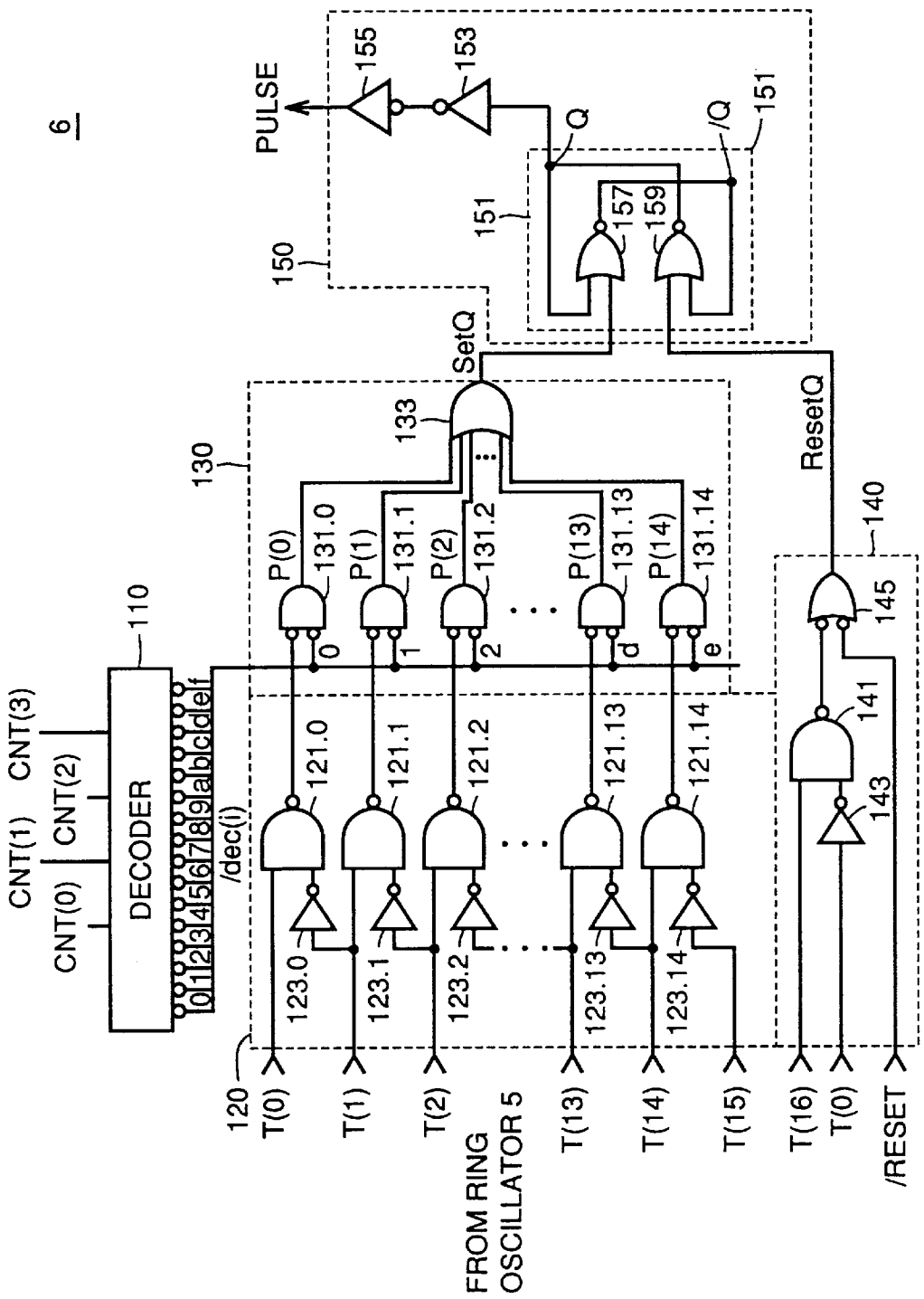
FIG. 11 is a circuit diagram showing one example of a specific configuration of a pulse generation circuit 6 of the first embodiment of the invention.
Figure 12:
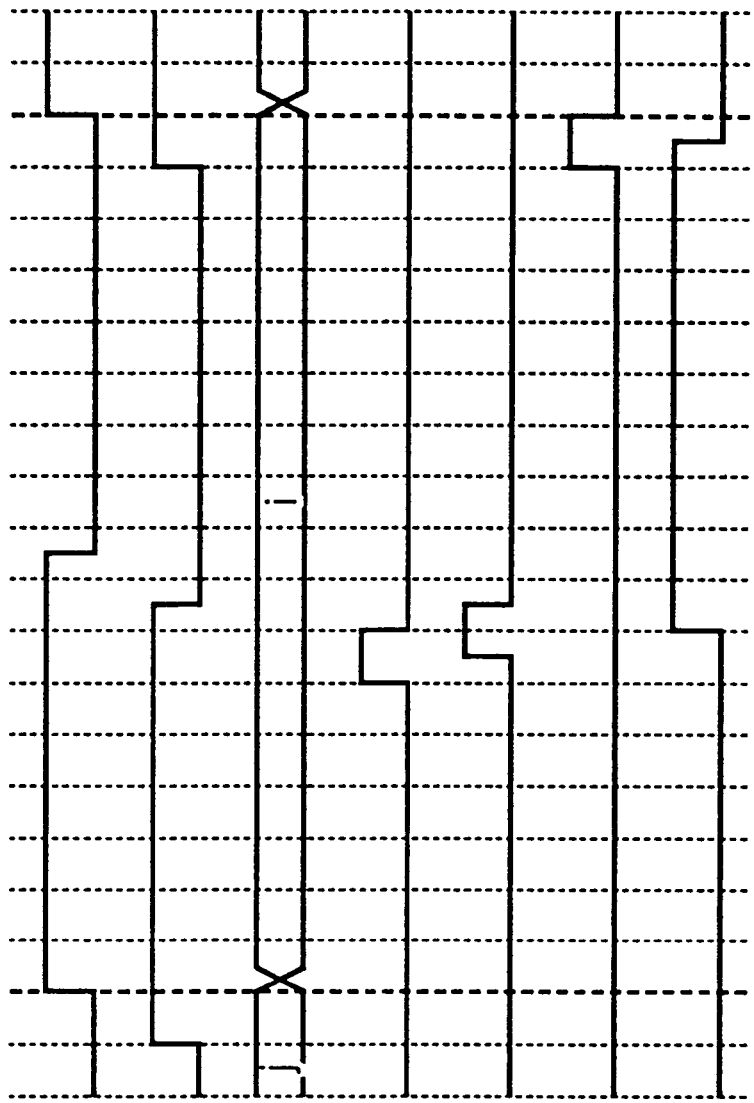
FIGS. 12A–12G are timing charts showing an operation of the pulse generation circuit 6 of FIG. 11.

One example of a specific configuration of pulse generation circuit 6 according to the first embodiment is described using FIG. 11 which is a circuit diagram.

As shown in FIG. 11, pulse generation circuit 6 includes a decoder 110, a pulse generation circuit 120, a pulse selection circuit 130, a reset circuit 140 and a pulse output circuit 150.

Decoder 110 outputs decode signal /dec(i) (i=0, 1, ..., 15) according to four-bit count values CNT(0), ..., CNT(3) output from counter 4.

Pulse generation circuit 120 outputs fifteen pulses based on pulse signals T(0), ..., T(15) output from ring oscillator 5.

Pulse selection circuit 130 selects, in response to decode signal /dec(i), one pulse (SetQ signal) among fifteen pulses output from pulse generation circuit 120 and outputs the selected one.

Reset circuit 140 generates, in response to pulse signal T(16), pulse signal T(0) supplied from ring oscillator 5 and reset signal /RESET, ResetQ signal and outputs the generated one.

Pulse output circuit 150 outputs pulse signal PULSE which drives the gate electrode of MOS transistor 12 shown in FIG. 1 based on SetQ signal output from pulse selection circuit 130 and ResetQ signal output from reset circuit 140.

Pulse generation circuit 120 is briefly described below.

Pulse generation circuit 120 includes a plurality of NAND circuits 121.0, 121.1, ..., 121.14 as well as a plurality of inverter circuits 123.0, 123.1, ..., 123.14.

A first input node of NAND circuit 121.i (i=0, ..., 14) receives a corresponding pulse signal T(i). A second input node of NAND circuit 121.i receives a signal which is an inverted one of pulse signal T(i+1) via a corresponding inverter circuit 123.i.

Pulse generation circuit 120 receives pulse signals T(0), ..., T(15) and obtains the difference of the timing of rising of adjacent pulse signals.

Pulse selection circuit 130 is briefly described below.

Pulse selection circuit 130 includes a plurality of logic gates 131.0, 131.1, ..., 131.14 and an OR circuit 133.

First input nodes of respective logic gates 131.0, ..., 131.14 receive corresponding decode signals /dec(0), ..., /dec(14). Respective second input nodes of logic gates 131.0, ..., 131.14 receive output signals from corresponding NAND circuits 121.0, ..., 121.14 in pulse generation circuit 120. Respective outputs from logic gates 131.0, ..., 131.14 are referred to as pulse signals P(0), ..., P(14).

OR circuit 133 receives pulse signals P(0), ..., P(14) output respectively from logic gates 131.0, ..., 131.14 at its input, and outputs SetQ signal (corresponding to any of pulse signals P(0), ..., P(14)). SetQ signal is used for specifying a rising edge of pulse signal PULSE.

Specifically, if count value CNT(3:0)=0000, the rising edge of pulse signal T(0) is used for specifying the rising edge of pulse signal PULSE. If count value CNT(3:0) corresponds to J, the rising edge of pulse signal T(J) is used.

Reset circuit 140 is hereinafter described.

Reset circuit 140 includes an NAND circuit 141, an inverter circuit 143 and a logic gate 145. A first input node of NAND circuit 141 receives pulse signal T(16) from ring oscillator 5. A second input node of NAND circuit 141 receives a signal which is an inverted one of pulse signal T(0) supplied from ring oscillator 5 via inverter circuit 143. Logic gate 145 receives an output signal from NAND circuit 141 and reset signal /RESET at its inputs. Logic gate 145 outputs ResetQ signal. ResetQ signal is used for specifying a falling edge of pulse signal PULSE.

Pulse output circuit 150 is briefly described below.

Pulse output circuit 150 includes an SR latch circuit 151, and inverter circuits 153 and 155.

SR latch circuit 151 is provided with NOR circuits 157 and 159. A first input node of NOR circuit 157 receives SetQ signal. A second input node of NOR circuit 157 is connected to an output node of NOR circuit 159. A first input node of NOR circuit 159 receives ResetQ signal. A second input node of NOR circuit 159 is connected to an output node of NOR circuit 157.

Specifically, if SetQ signal is at the high level, output signal Q (an output signal from NOR circuit 159) becomes 1 and output signal /Q (an output signal from NOR circuit 157) becomes 0. If ResetQ signal is at the high level, output signal Q becomes 0 and output signal /Q becomes 1. If both of SetQ signal and ResetQ signal are at the low level, the values of output signal Q and output signal /Q are maintained as they are. If both of SetQ signal and ResetQ signal are at the high level, the values of both of output signals Q and output signal /Q become 0.

Inverter circuit 153 is connected to the output node of NOR circuit 159. Inverter circuit 155 is connected to inverter circuit 153. Pulse signal PULSE is output from inverter circuit 153.

In FIG. 11, by configuring SR latch circuit 151 of two NOR circuits 157 and 159, an output from SR latch circuit 151 (Q in FIG. 11) is determined giving priority to reset. Accordingly, in response to ResetQ signal, pulse signal PULSE drops to the low level in each cycle.

Using FIGS. 12A–12G that are timing charts, an operation of pulse generation circuit 6 shown in FIG. 11 is described.

FIGS. 12A, 12B, 12C, and 12D respectively show main clock CLK (=T(0)), signal φcntupdate which controls the operation of counter 4, decode signal /dec(i) output from decoder 110, and pulse signal P(i) output from logic gate 131.i (any of i=0, ..., 14). Further, FIGS. 12E, 12F and 12G respectively show SetQ signal, ResetQ signal, and pulse signal PULSE.

In response to main clock CLK, the count value of counter 4 is updated by signal φcntupdate. Accordingly, a corresponding decode signal /dec(i) is output from decoder 110.

Pulse generation circuit 120 generates fifteen pulse signals according to the difference of the timing of adjacent pulse signals T(i) and T(i+1) output from ring oscillator 5.

In response to decode signal /dec (i), pulse selection circuit 130 selects one pulse signal (pulse signal P(i)) out of fifteen pulse signals, and outputs the selected one as SetQ signal.

Reset circuit 140 generates ResetQ signal from pulse signals T(16) and T(0).

Pulse output circuit 150 generates pulse signal PULSE which attains the high level in a period between respective rising edges of SetQ signal and ResetQ signal.

Figure 13:
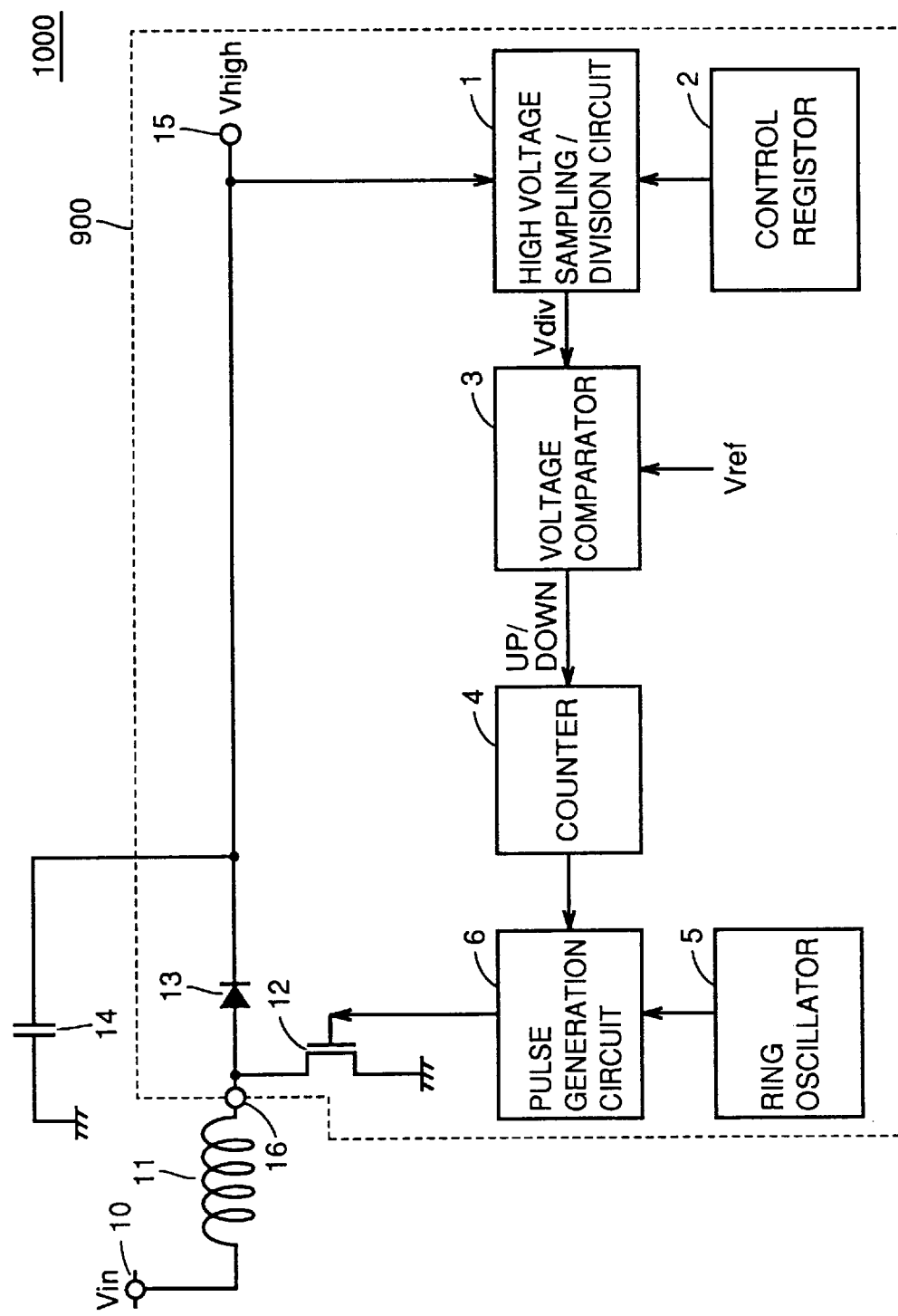
FIG. 13 schematically shows another example of a case in which the high voltage generation circuit 1000 of the first embodiment is applied to the semiconductor memory device 900.

Another example of a case in which high voltage generation circuit 1000 of the first embodiment is applied to semiconductor memory device 900 is described using FIG. 13.

As shown in FIG. 13, inductance 11 and capacitor 14 of high voltage generation circuit 1000 may be externally attached to semiconductor memory device 900.

As heretofore described, using the high voltage generation circuit of the present invention, high voltage can be generated by digitally adjusting an amount of current flowing into a capacitor element. In particular, if the low supply voltage is used, high voltage can be generated more precisely by configuring a circuit digitally rather than configuring a circuit in an analog way.

The voltage division by the capacitor enables the level of divided voltage to be adjusted.

By employing a comparator of the latch type as a comparison circuit for comparing with the reference voltage, comparison operation can be digitally carried out responsive to a clock signal.

Further, by changing a width of the high level of a pulse signal digitally, pulses of different duty factors can be generated.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A high voltage generation circuit having a first capacitor element and generating a voltage by enabling or disabling a path of current flowing into said first capacitor element and storing charge in said first capacitor element, comprising:

comparison and determination means responsive to clock signals for comparing the generated voltage with a desired voltage and determining when said generated voltage is equal to said desired voltage;

count means for outputting a value which is digitally controlled based on a result of comparison and determination by said comparison and determination means;

pulse generation means for outputting a pulse signal whose duty factor is changed based on said value of said count means; and switch means for enabling or disabling said path of current based on the pulse signal output from said pulse generation means.

2. The high voltage generation circuit according to claim 1, wherein said comparison and determination means includes:
   sampling means responsive to a first clock signal of said clock signals for sampling said generated voltage;
   division means responsive to a second clock signal of said clock signals for executing voltage division for the sampled voltage; and
   comparison means responsive to a third clock signal of said clock signals for comparing the voltage obtained by the voltage division with said desired voltage.

3. The high voltage generation circuit according to claim 2, wherein said division means for executing voltage division includes a plurality of second capacitor elements, and
   selects any of said plurality of second capacitor elements according to said desired voltage, and in response to said second clock signal, executes voltage division for said sampled voltage by the selected second capacitor element.

4. The high voltage generation circuit according to claim 2, wherein said comparison means is a comparator of a latch type, and
   evaluates said voltage obtained by voltage division and said desired voltage at an edge of said third clock signal and outputs a result of the evaluation.

5. The high voltage generation circuit according to claim 1, wherein said pulse generation means changes said duty factor by keeping a cycle of said pulse signal constant and changing a width in which said pulse signal is at a high level.

6. The high voltage generation circuit according to claim 5, wherein said switch means is an MOS transistor, and
   one conduction terminal of said MOS transistor is connected to a first supply potential, the other conduction terminal thereof is connected to said path of current, and a gate electrode thereof receives said pulse signal output from said pulse generation means, and
   one terminal of said first capacitor element is connected to a second supply potential, and the other terminal thereof is connected to said path of current.

* * * * *